(12) United States Patent
Jhang et al.

(10) Patent No.: US 8,774,239 B2
(45) Date of Patent: Jul. 8, 2014

(54) ULTRAFAST LASER GENERATING SYSTEM AND METHOD THEREOF

(75) Inventors: Yao Wun Jhang, Chiayi (TW); Hsin Chia Su, Yunlin County (TW); Chien Ming Huang, Chiayi (TW); Chieh Hu, Chiayi (TW); Hong Xi Tsau, Kaohsiung County (TW); Shih Ting Lin, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 82 days.

(21) Appl. No.: 13/372,841

(22) Filed: Feb. 14, 2012

(65) Prior Publication Data

US 2013/0141781 A1 Jun. 6, 2013

(30) Foreign Application Priority Data

Dec. 5, 2011 (TW) .............................. 100144575 A (51) Int. Cl.
*H01S 3/10* (2006.01)
*H04B 10/17* (2006.01)

(52) U.S. Cl.
USPC ..................... 372/25; 359/341.1; 359/341.3

(58) Field of Classification Search
USPC ................. 372/25; 359/341.1, 341.3
See application file for complete search history.

(56) References Cited

U.S. PATENT DOCUMENTS

| | | | |
|---|---|---|---|
| 6,016,324 A | 1/2000 | Rieger et al. | |
| 6,097,741 A | 8/2000 | Lin et al. | |
| 7,453,913 B2 | 11/2008 | Jiang et al. | |
| 7,477,666 B2 | 1/2009 | Liu | |
| 7,764,719 B2 | 7/2010 | Munroe et al. | |
| 7,768,700 B1 | 8/2010 | Savage-Leuchs | |
| 2005/0271094 A1* | 12/2005 | Miller et al. | ..................... 372/25 |
| 2006/0171018 A1* | 8/2006 | Galvanauskas et al. | ....... 359/333 |
| 2009/0141751 A1* | 6/2009 | Kakui | .............................. 372/25 |
| 2010/0177794 A1 | 7/2010 | Peng et al. | |

OTHER PUBLICATIONS

Carlo Amadeo et al., "Harmonic mode locking in a sliding-frequency fiber laser," Optics Letters, pp. 1590, May 2011, vol. 36, No. 9.
I.-H. Baek et al., "Singled-walled carbon nanotube saturable absorber assisted high-power mode-locking of a Ti: sapphire laser, "Optics Express, pp. 7833, Apr. 2011, vol. 19, No. 8.
H.-Q Lam et al., "Mode locking of an erbium-doped fiber laser with intra-cavity polarization modulation," Optics Communications, pp. 1026, Oct. 2010, vol. 284.
R. Peng et al., "Picosecond laser oscillator with a cavity design for table CW mode-locking operation," Optics & Laser Technology, pp. 1282-1285, Apr. 2010, vol. 42.
W. Guan et al., Complete elimination of self-pulsations in dual-clad ytterbium-doped fiber lasers at all pumping levels, Optics Letters, Mar. 15, 2009. pp. 815-817, vol. 34, No. 6.

(Continued)

*Primary Examiner* — Eric Bolda
(74) *Attorney, Agent, or Firm* — WPAT, P.C.; Anthony King (57) ABSTRACT

An ultrafast laser generating system comprises a laser signal generator, a laser signal amplifier and a beam splitting element. The laser signal generator is configured to generate a first nanosecond pulse laser. The laser amplifier is configured to amplify the first nanosecond pulse laser from the laser signal generator so as to generate a second nanosecond pulse laser, which includes a picosecond pulse laser. The beam splitting element is configured to receive the second nanosecond pulse laser and split the picosecond pulse laser from the second nanosecond pulse laser.

19 Claims, 6 Drawing Sheets

(56) References Cited

OTHER PUBLICATIONS

Francois Brunet et al., A Simple Model Describing Both Self-Mode Locking and Sustained Self-Pulsing in Ytterbium-Doped Ring Fiber Lasers, Journal of Lightwave Technology, Jun. 2005, p. 2131-2138vol. 23, No. 6.

Office Action issued from Taiwan Patent office on Mar. 13, 2014 for corresponding Taiwan patent application 100144575.

English translation of office action issued from Taiwan Patent office on Mar. 13, 2014 for corresponding Taiwan patent application 100144575.

Chien-Ming Huang et al., Self mode-locked pico-second pulse of ytterbium(Yb) doped fiber in all fiber normal dispersion configuration, Jul. 2011, OECC 2011, pp. 599-600.

* cited by examiner

ULTRAFAST LASER GENERATING SYSTEM AND METHOD THEREOF

TECHNICAL FIELD

The current disclosure relates to an ultrafast laser generating system and a method of generating an ultrafast laser.

BACKGROUND

Ultrafast lasers have been applied to optical data processing, data transmission, optical detection having high timing resolution, and material processing. Current ultrafast laser generating mechanisms may include three types: active mode-locked, passive mode-locked and gain switched.

Regarding the active mode-locked mechanism, a suitable loss modulation component, such as an electro-optical modulation component or an acousto-optical modulation component, is placed in a resonance cavity so that a modulated frequency is equal to a longitudinal mode frequency.

Regarding the passive mode-locked mechanism, a saturation absorber is placed in a laser resonance cavity such that an inherent property, i.e., interaction between the saturation absorber and laser may be utilized without using any extra modulation source.

As to the gain switched mechanism, it allows laser to release pulsed light having high power pulses. Thus, the laser triggered by the gain switched mechanism has a greater power than that triggered by a continuous wave.

SUMMARY

In accordance with one embodiment of the current disclosure, an ultrafast laser generating system comprises a laser signal generator, a laser signal amplifier and a beam steering device. The laser signal generator is configured to generate a first nanosecond laser pulse. The laser signal amplifier is configured to amplify the first nanosecond laser pulse to generate a second nanosecond laser pulse, which includes a picosecond laser pulse. The beam steering device is configured to receive the second nanosecond laser pulse and split the picosecond laser pulse from the second nanosecond laser pulse.

In accordance with another embodiment of the current disclosure, an ultrafast laser generating system comprises a laser signal generator, a laser signal amplifier and a beam steering device. The laser signal generator is configured to generate a first nanosecond laser pulse. The laser signal amplifier is configured to amplify the first nanosecond laser pulse to generate a second nanosecond laser pulse, which includes a picosecond laser pulse. The beam steering device is configured to receive the second nanosecond laser pulse and split the picosecond laser pulse therefrom. Moreover, the time for the laser signal generator to generate an output power is less than one nanosecond.

In accordance with one embodiment of the current disclosure, a method for generating an ultrafast laser comprises the steps of generating a first nanosecond laser pulse, amplifying the first nanosecond laser pulse to generate a second nanosecond laser pulse having a picosecond laser pulse, and splitting the picosecond laser pulse from the second nanosecond laser pulse.

The foregoing has outlined rather broadly the features and technical advantages of the current disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the current disclosure. It should also be realized by those skilled in the art that such equivalent constructions do not depart from the spirit and scope of the disclosure as set forth in the appended claims.

BRIEF DESCRIPTION OF THE DRAWINGS

The objectives and advantages of the current disclosure are illustrated with the following description and upon reference to the accompanying drawings in which.

DETAILED DESCRIPTION OF DISCLOSED EMBODIMENTS

Figure 1:
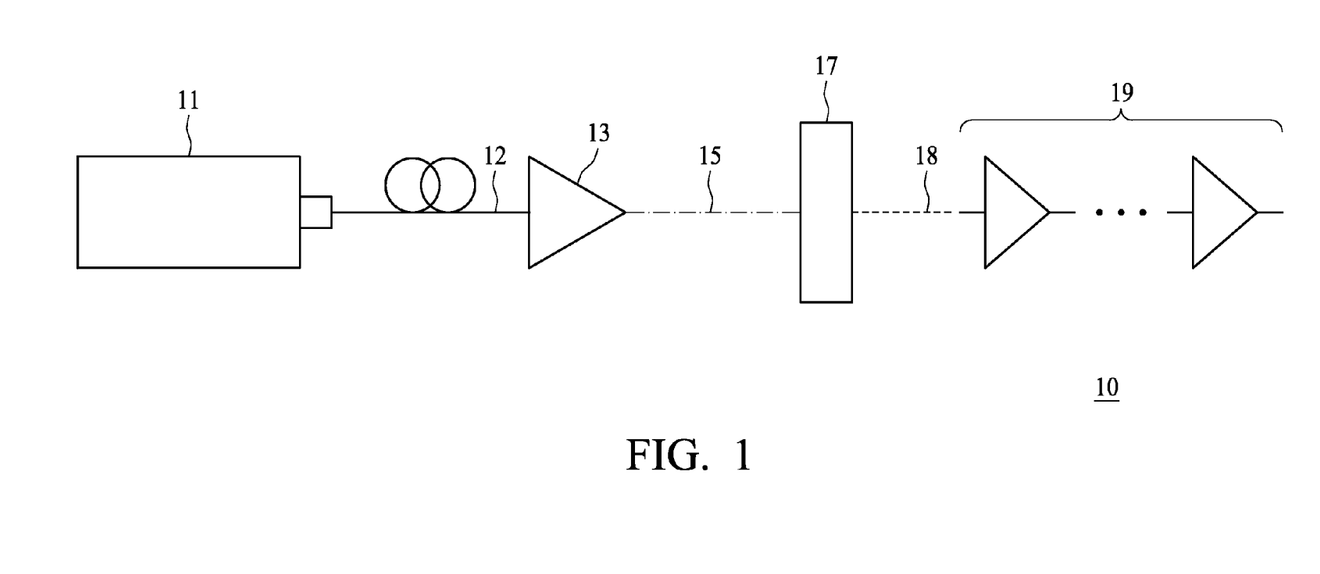
FIG. 1 is a schematic diagram of an ultrafast laser generating system in accordance with an embodiment of the current disclosure.

FIG. 1 is a schematic diagram of an ultrafast laser generating system 10 in accordance with an embodiment of the current disclosure. Referring to FIG. 1, the ultrafast laser generating system 10 comprises a laser signal generator 11, a laser signal amplifier 13 and a beam steering device 17. An optical fiber 12 is configured to connect the laser signal generator 11 to the laser signal amplifier 13 in order to transmit a first nanosecond laser pulse from the laser signal generator 11 to the laser signal amplifier 13.

In some embodiments of the current disclosure, the laser signal generator 11 may be a laser source. In some embodiments of the current disclosure, the laser source generates the first nanosecond laser pulse by pulsing. Moreover, the first nanosecond laser pulse has a repeating rate of less than 1 megahertz (MHz). In still some embodiments of the current disclosure, the first nanosecond laser pulse has a pulse width of less than 1000 nanoseconds.

The laser signal amplifier 13 is configured to amplify the first nanosecond laser pulse to generate a second nanosecond laser pulse 15. The second nanosecond laser pulse 15 includes a picosecond laser pulse 18 and is transmitted to the beam steering device 17.

The beam steering device 17 is configured to split the picosecond laser pulse 18 from the second nanosecond laser pulse 15. In some embodiments of the current disclosure, a pulse width of the picosecond laser pulse 18 is less than $10^{-9}$ second. In some embodiments of the current disclosure, the beam steering device 17 includes a grating, a prism unit, a diffractive element or an optical filter. In some embodiments of the current disclosure, the picosecond laser pulse 18 is amplified by one or more amplifier 19 after passing through the beam steering device 17. In another embodiment of the current disclosure, a rise time of an output power or a fall time of an output power from the laser signal generator 11 is less than 1000 nanoseconds.

Figure 2:
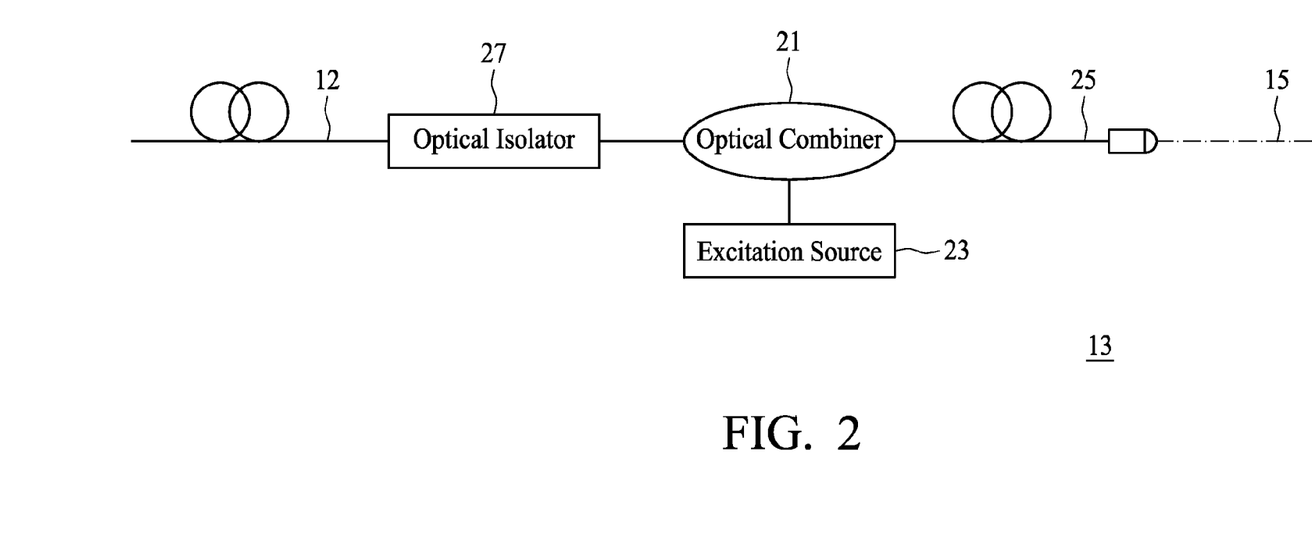
FIG. 2 is a schematic diagram of a laser signal amplifier of the ultrafast laser generating system illustrated in FIG. 1.

FIG. 2 is a schematic diagram of the laser signal amplifier 13 of the ultrafast laser generating system 10 illustrated in FIG. 1. As shown in FIG. 2, the laser signal amplifier 13 has a pump wavelength of 780 to 820 nanometer (nm) in one embodiment, 900 to 1000 nm in another embodiment, and 1020 to 1060 nm in still another embodiment. Moreover, the laser signal amplifier 13 includes an optical isolator 27, an excitation source 23, an optical combiner 21 and a signal gain fiber 25. In some embodiments of the current disclosure, the signal gain fiber 25 includes a Yb-doped fiber. In some embodiments of the current disclosure, the excitation source 23 has an excitation power greater than or equal to approximately 500 milliwatts (mW).

The first nanosecond laser pulse from the laser signal generator 11 is transmitted to the optical combiner 21 via the optical isolator 27. The excitation source 23 is coupled to the optical combiner 21 and provides excitation light to excite the first nanosecond laser pulse to generate the second nanosecond laser pulse 15, which in turn is transmitted to the beam steering device 17 via the signal gain fiber 25.

Figure 3:
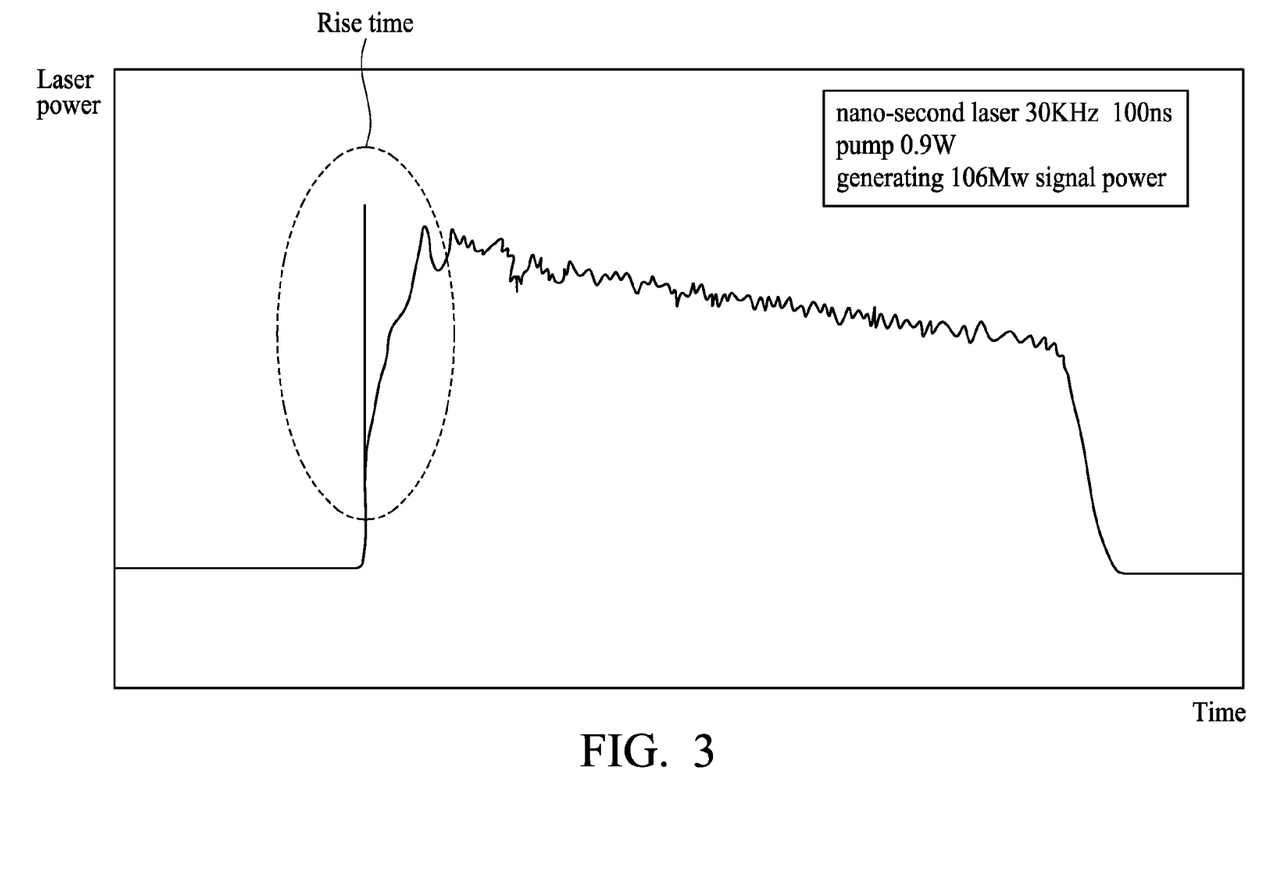
FIG. 3 is a diagram schematically showing the generation of a second nanosecond laser pulse by an ultrafast laser generating system in accordance with an embodiment of the current disclosure.

FIG. 3 is a diagram schematically showing the generation of a second nanosecond laser pulse by an ultrafast laser generating system in accordance with an embodiment of the current disclosure. The generating parameters are exemplary only and are not intended to limit the disclosure. As shown in FIG. 3, the power of the first nanosecond laser pulse rapidly rises to an excited state from a ground state by the excitation power of the excitation source 23. Next, the first nanosecond laser pulse absorbs the power of atoms at the excited state to generate the second nanosecond laser pulse. In one embodiment, the second nanosecond laser pulse has a repeating rate of approximately 30 KHz, a pulse width of approximately 100 nanoseconds and a signal power of approximately 106 milliwatts (mW).

Figure 4:
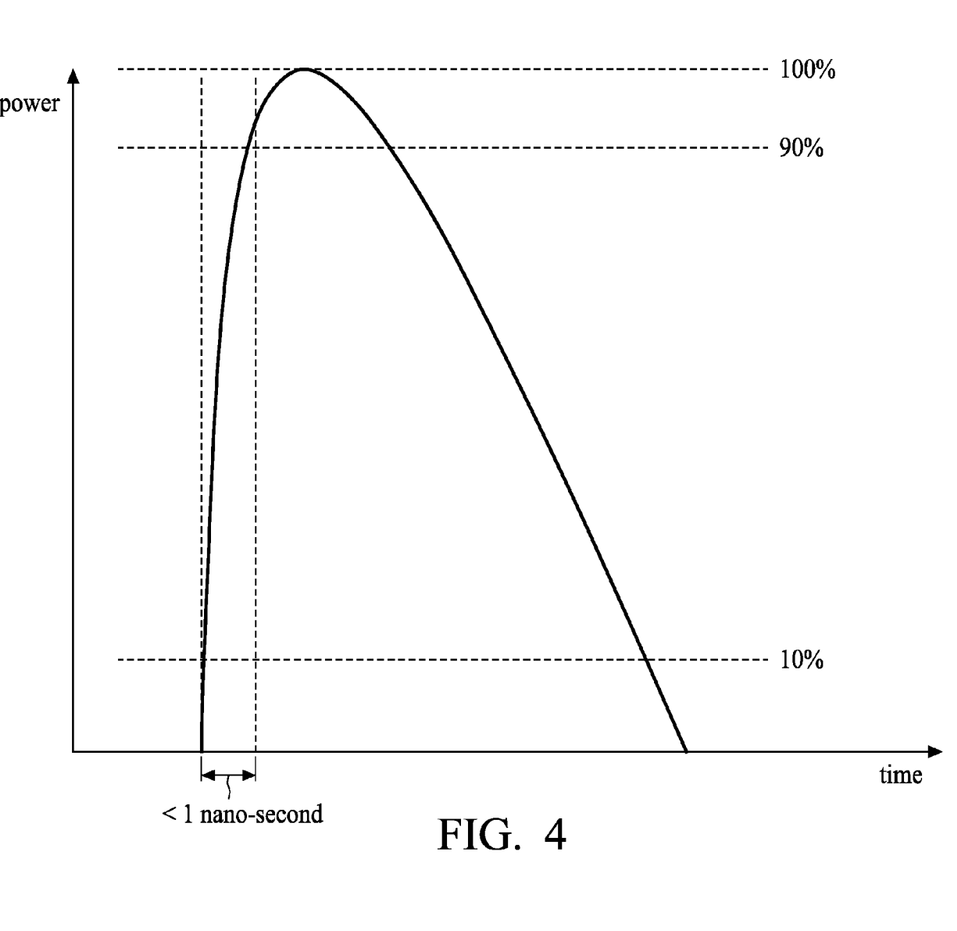
FIG. 4 is a drawing showing a rise time in the generation of a second nanosecond laser pulse by an ultrafast laser generating system illustrated in FIG. 3.

FIG. 4 is a drawing showing a rise time in the generation of the second nanosecond laser pulse by the ultrafast laser generating system illustrated in FIG. 3. As shown in FIG. 4, the time needed for a laser power of the laser signal generator 11 to rise from 10 percent to 90 percent of the maximum power is less than one nanosecond. In other words, the first nanosecond laser pulse power rises from the ground state to the excited state in less than one nanosecond. Subsequently, the first nanosecond power falls dramatically from the excited state, resulting in the second nanosecond laser pulse.

Figure 5:
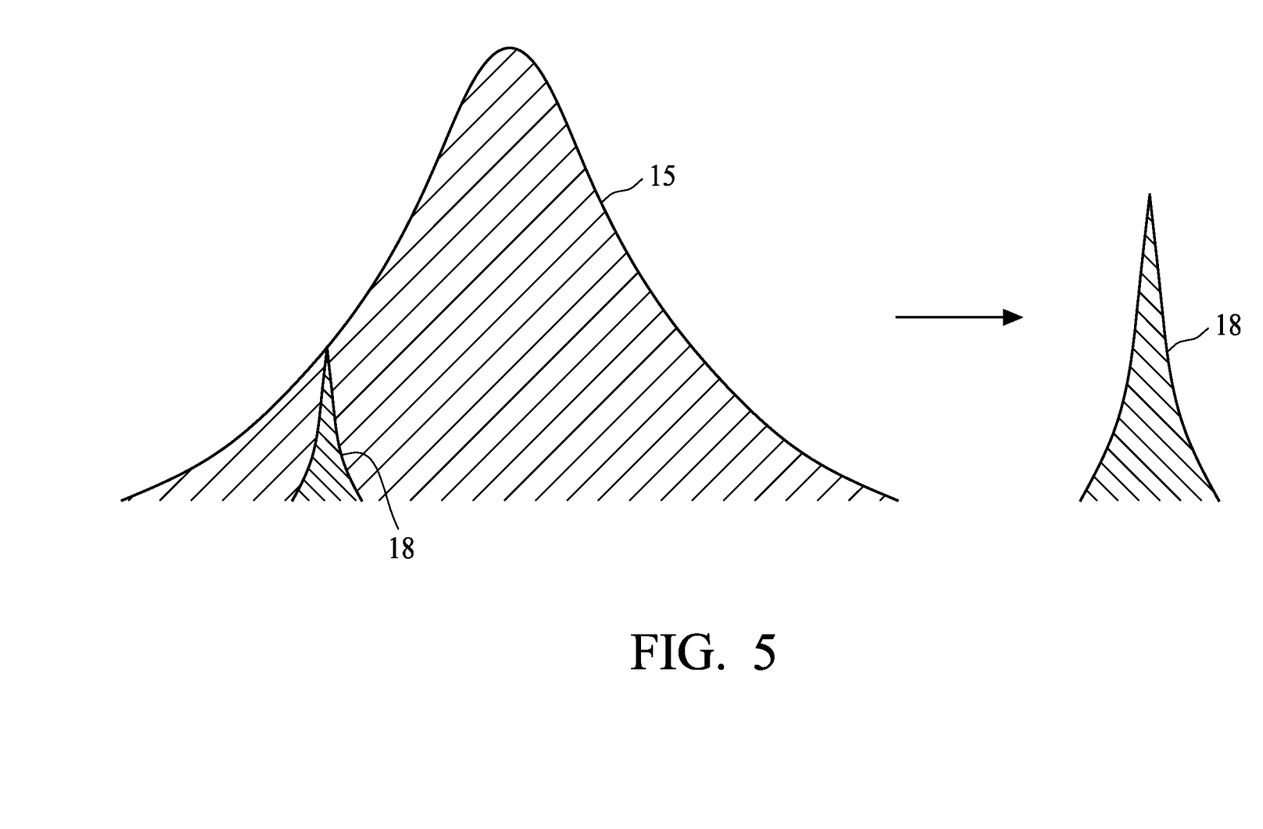
FIG. 5 is a diagram schematically showing the splitting of a one-picosecond laser pulse from a second nanosecond laser pulse in an ultrafast laser generating system in accordance with an embodiment of the current disclosure.

FIG. 5 is a diagram schematically showing the splitting of a one picosecond laser pulse from a second nanosecond laser pulse in an ultrafast laser generating system in accordance with an embodiment of the present disclosure. Referring to FIG. 5 and also FIG. 1, the picosecond laser pulse 18 is split by the beam steering device 17 from the second nanosecond laser pulse 15. In some embodiments of the current disclosure, since the second nanosecond laser pulse 15 has a different wave length than the picosecond laser pulse 18, the picosecond laser pulse 18 may be split from the second nanosecond laser pulse 15 by the beam steering device 17, which is able to separate light of different wavelengths.

Figure 6:
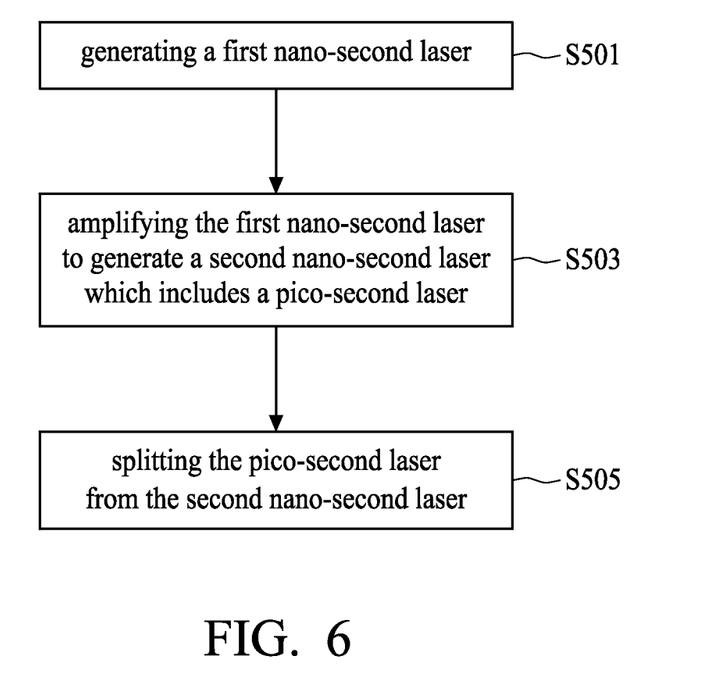
FIG. 6 is a flow diagram showing a method of generating an ultrafast laser in accordance with an embodiment of the current disclosure.

FIG. 6 is a flow showing a method of generating an ultrafast laser in accordance with an embodiment of the current disclosure.

At step 501, a first nanosecond laser pulse is generated by, for example, a laser signal generator.

At step 503, the first nanosecond laser pulse is amplified by, for example, a laser signal amplifier, to generate a second nanosecond laser pulse, which includes a picosecond laser pulse.

At step 505, the picosecond laser pulse is split from the second nanosecond laser pulse by, for example, a beam steering device.

In some embodiments of the current disclosure, the first nanosecond laser pulse has a pulse width of less than 1000 nanoseconds. Furthermore, a repeating rate of the first nanosecond laser pulse is less than 1 MHz. In still some embodiments of the current disclosure, the pulse width of the picosecond laser pulse is less than $10^{-9}$ second.

Although the current disclosure and its objectives have been described in detail, it should be understood that various changes, substitutions and alterations can be made herein without departing from the spirit and scope of the disclosure as defined by the appended claims. For example, many of the processes discussed above can be implemented using different methodologies, replaced by other processes, or a combination thereof.

Moreover, the scope of the current application is not intended to be limited to the particular embodiments of the process, machine, manufacture, composition of matter, means, methods and steps described in the specification. As one of ordinary skill in the art will readily appreciate from the disclosure of the current disclosure, processes, machines, manufacture, compositions of matter, means, methods, or steps, currently existing or later to be developed, that perform substantially the same function or achieve substantially the same result as the corresponding embodiments described herein may be utilized according to the current disclosure. Accordingly, the appended claims are intended to include within their scope such processes, machines, manufacture, compositions of matter, means, methods, or steps.

What is claimed is:

1. An ultrafast laser generating system, comprising:
   a laser signal generator configured to generate a first nanosecond laser pulse having a pulse width less than 1000 nanoseconds;
   a laser signal amplifier configured to amplify the first nanosecond laser pulse to generate a second nanosecond laser pulse, wherein the second nanosecond laser pulse includes a picosecond laser pulse; and
   a beam steering device configured to receive the second nanosecond laser pulse and split the picosecond laser pulse from the second nanosecond laser pulse.

2. The ultrafast laser generating system of claim 1, wherein the laser signal amplifier comprises a signal gain fiber.

3. The ultrafast laser generating system of claim 2, wherein the laser signal amplifier further comprises an excitation source, wherein the excitation source has an excitation power of greater than or equal to 500 mW.

4. The ultrafast laser generating system of claim 1, wherein the beam steering device comprises a grating, a prism unit, a diffractive element or an optical filter.

5. The ultrafast laser generating system of claim 1, wherein a pulse width of the picosecond laser pulse is less than $10^{-9}$ second.

6. The ultrafast laser generating system of claim 1, wherein the laser signal generator generates the first nanosecond laser pulse by pulsing, and wherein the first nanosecond laser pulse has a repeating rate of less than 1 MHz.

7. The ultrafast laser generating system of claim 1 further comprising at least one amplifier, wherein the picosecond laser pulse is amplified by the at least one amplifier after passing the beam steering device.

8. The ultrafast laser generating system of claim 1, wherein the laser signal generator comprises a laser source, which is configured to generate the first nanosecond laser pulse.

9. An ultrafast laser generating system, comprising:
a laser signal generator configured to generate a first nanosecond laser pulse having a pulse width less than 1000 nanoseconds;
a laser signal amplifier configured to amplify the first nanosecond laser pulse to generate a second nanosecond laser pulse, wherein the second nanosecond laser pulse includes a picosecond laser pulse; and
a beam steering device configured to receive the second nanosecond laser pulse and split the picosecond laser pulse from the second nanosecond laser pulse,
wherein a rise time of an output power of the laser signal generator is less than one nanosecond.

10. The ultrafast laser generating system of claim 9, wherein the laser signal generator comprises a signal gain fiber.

11. The ultrafast laser generating system of claim 10, wherein the laser signal amplifier further comprises an excitation source, and wherein the excitation source has an excitation power of greater than or equal to 500 MW.

12. The ultrafast laser generating system of claim 9, wherein the beam steering device comprises a grating, a prism unit, a diffractive element or an optical filter.

13. The ultrafast laser generating system of claim 9, wherein a pulse width of the picosecond laser pulse is less than $10^{-9}$ second.

14. The ultrafast laser generating system of claim 9, wherein the laser signal generator generates the first nanosecond laser pulse by pulsing, and wherein the first nanosecond laser pulse has a repeating rate of less than 100 kHz.

15. The ultrafast laser generating system of claim 9 further comprising at least one optical amplifier, wherein the picosecond laser pulse is amplified by the at least one optical amplifier after passing the beam steering device.

16. The ultrafast laser generating system of claim 9, wherein the laser signal generator comprises a laser source, which is configured to generate the first nanosecond laser pulse.

17. A method for generating an ultrafast laser, comprising the steps of:
generating a first nanosecond laser pulse having a pulse width less than 1000 nanoseconds;
amplifying the first nanosecond laser pulse to generate a second nanosecond laser pulse, which includes a picosecond laser pulse; and
splitting the picosecond laser pulse from the second nanosecond laser pulse.

18. The method for generating an ultrafast laser of claim 17, wherein a pulse width of the picosecond laser pulse is less than $10^{-9}$ second.

19. The method for generating an ultrafast laser of claim 17, wherein a repeating rate of the first nanosecond laser pulse is less than 100 kHz.

* * * * *